United States Patent
Sugasawa

(10) Patent No.: US 12,220,815 B2
(45) Date of Patent: Feb. 11, 2025

(54) PARALLEL LINK ROBOT

(71) Applicant: FANUC CORPORATION, Yamanashi (JP)

(72) Inventor: Kounosuke Sugasawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/546,946

(22) PCT Filed: Mar. 24, 2022

(86) PCT No.: PCT/JP2022/013869
§ 371 (c)(1),
(2) Date: Aug. 17, 2023

(87) PCT Pub. No.: WO2022/210243
PCT Pub. Date: Oct. 6, 2022

(65) Prior Publication Data
US 2024/0131692 A1 Apr. 25, 2024
US 2024/0227171 A9 Jul. 11, 2024

(30) Foreign Application Priority Data
Mar. 30, 2021 (JP) ................................. 2021-057765

(51) Int. Cl.
*B25J 9/00* (2006.01)
*B25J 9/10* (2006.01)

(52) U.S. Cl.
CPC .................. *B25J 9/1065* (2013.01)

(58) Field of Classification Search
CPC ..... B25J 9/1065; B25J 9/0051; B25J 17/0275
See application file for complete search history.

(56) References Cited

U.S. PATENT DOCUMENTS

2020/0078965 A1* 3/2020 Souk ..................... B25J 17/00
2020/0376653 A1* 12/2020 Ootani ................... B25J 9/107

FOREIGN PATENT DOCUMENTS

JP 2010207967 A 9/2010
JP 2014073554 A 4/2014
(Continued)

OTHER PUBLICATIONS

English Translation of WO-2019008023-A1 (Year: 2019).*
(Continued)

*Primary Examiner* — Victor L MacArthur
(74) *Attorney, Agent, or Firm* — Renner, Otto, Boisselle & Sklar, LLP

(57) ABSTRACT

A parallel link robot includes a base, a movable member, and multiple arms that connect the base and the movable member in parallel. Each of the arms includes: a drive link that is rotationally driven by a motor in the base; two parallel passive links that couple the drive link and the movable member; ball joints between the drive link and the corresponding passive link and between the movable member and the corresponding passive link; and attachment mechanisms that detachably attach the ball joints to the corresponding drive link or the movable member. Each ball joint includes a ball and a fixed part integral with the ball. At least one of the attachment mechanisms includes: a first screw hole in the fixed part; a second through-hole in the drive link or the movable member; and a screw member that is fastened to the first screw hole through the second through-hole.

4 Claims, 9 Drawing Sheets

(56) References Cited

FOREIGN PATENT DOCUMENTS

| | | | |
|---|---|---|---|
| JP | 2019038051 | A | 3/2019 |
| JP | 2019119017 | A | 7/2019 |
| JP | 2020180633 | A | 11/2020 |
| WO | WO-2019008023 | A1 * | 1/2019 |

OTHER PUBLICATIONS

Written Opinion Translation for PCT JP2002013869 (Year: 2023).*
International Search Report and Written Opinion issued for priority International Application No. PCT/JP2022/013869, mailed Jun. 14, 2022 (translation of Search Report only).

* cited by examiner ated in FIG. 1.
PARALLEL LINK ROBOT

This application is a national phase of International Application No. PCT/JP2022/013869, filed Mar. 24, 2022, which claims priority to Japanese Application No. 2021-057765, filed Mar. 30, 2021, each of which is hereby incorporated herein by reference in its entirety.

TECHNICAL FIELD

The present disclosure relates to a parallel link robot.

BACKGROUND ART

There is a known parallel link robot equipped with three arms that connect a base and a movable part in parallel, each of the arms including a drive link driven by a motor and a pair of parallel passive links that connect the drive link and the movable part (for example, see PTL 1).

Ball joints rotatably connect the drive link to the two passive links and the two passive links to the movable part.

The two passive links of each arm are located to sandwich the drive link and the movable part from two side surfaces in an axial direction parallel to the rotation axis of the drive link. Screw holes that extend along the axial direction are formed in both side surfaces of the drive link and both side surfaces of the movable part in the axial direction, and male screws fixed to balls of the ball joints are fastened into the screw holes to thereby fix the ball joints.

CITATION LIST

Patent Literature

{PTL 1}
Japanese Unexamined Patent Application, Publication No. 2019-119017

SUMMARY OF INVENTION

An aspect of the present disclosure is directed to a parallel link robot comprising: a base part; a movable member spaced from the base part; and multiple arms that connect the base part and the movable member in parallel, in which each of the arms includes: a drive link rotationally driven by a motor installed in the base part; two parallel passive links that connect the drive link to the movable member; a ball joint disposed between the passive links and the drive link and a ball joint disposed between the passive links and the movable member; and attachment mechanisms that detachably attach each of the ball joints to the drive link or the movable member, each of the ball joints includes a ball and a fixed part integrated with the ball, and, in each of the arms, at least one of the attachment mechanism between the passive links and the drive link and the attachment mechanism between the passive links and the movable member includes a first screw hole or first through-hole formed in the fixed part, a second through-hole or second screw hole formed in the drive link or the movable member, and a screw member that penetrates through the first through-hole and is fastened to the second screw hole or that penetrates through the second through-hole and is fastened to the first screw hole.

DESCRIPTION OF EMBODIMENTS

A parallel link robot 1 according to a first embodiment of the present disclosure will now be described with reference to the drawings.

Figure 1:
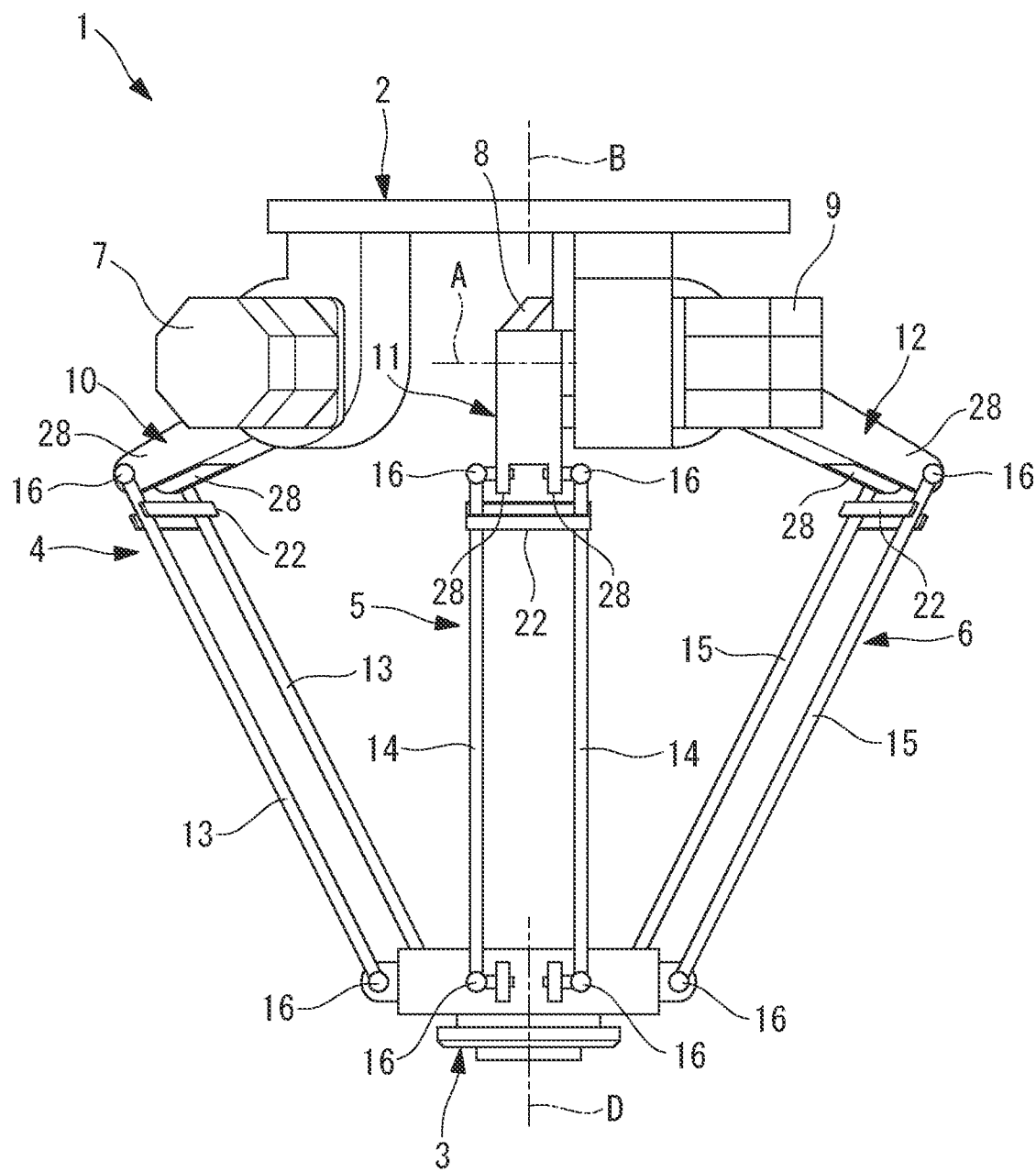
FIG. 1 is a front view of a parallel link robot according to one embodiment of the present disclosure.

As illustrated in FIG. 1, the parallel link robot 1 of this embodiment is equipped with a base part 2 to be fixed to a ceiling or a pedestal, a movable member 3 that is disposed below the base part 2 with a distance therebetween, and three arms 4, 5, and 6 that connect the base part 2 and the movable member 3 in parallel.

Three servo motors (motors) 7, 8, and 9 for respectively driving the three arms 4, 5, and 6 are installed in the base part 2.

Each arm 4, 5, 6 is equipped with a drive link 10, 11, 12 that is rotationally driven about a horizontal rotation axis A by the servo motor 7, 8, 9, and two parallel rod-shaped passive links 13, 14, 15 that connect the drive link 10, 11, 12 and the movable member 3. The three drive links 10, 11, and 12 are equally spaced from one another other about a center axis B that extends in the vertical direction through the center of the base part 2.

Figure 2:
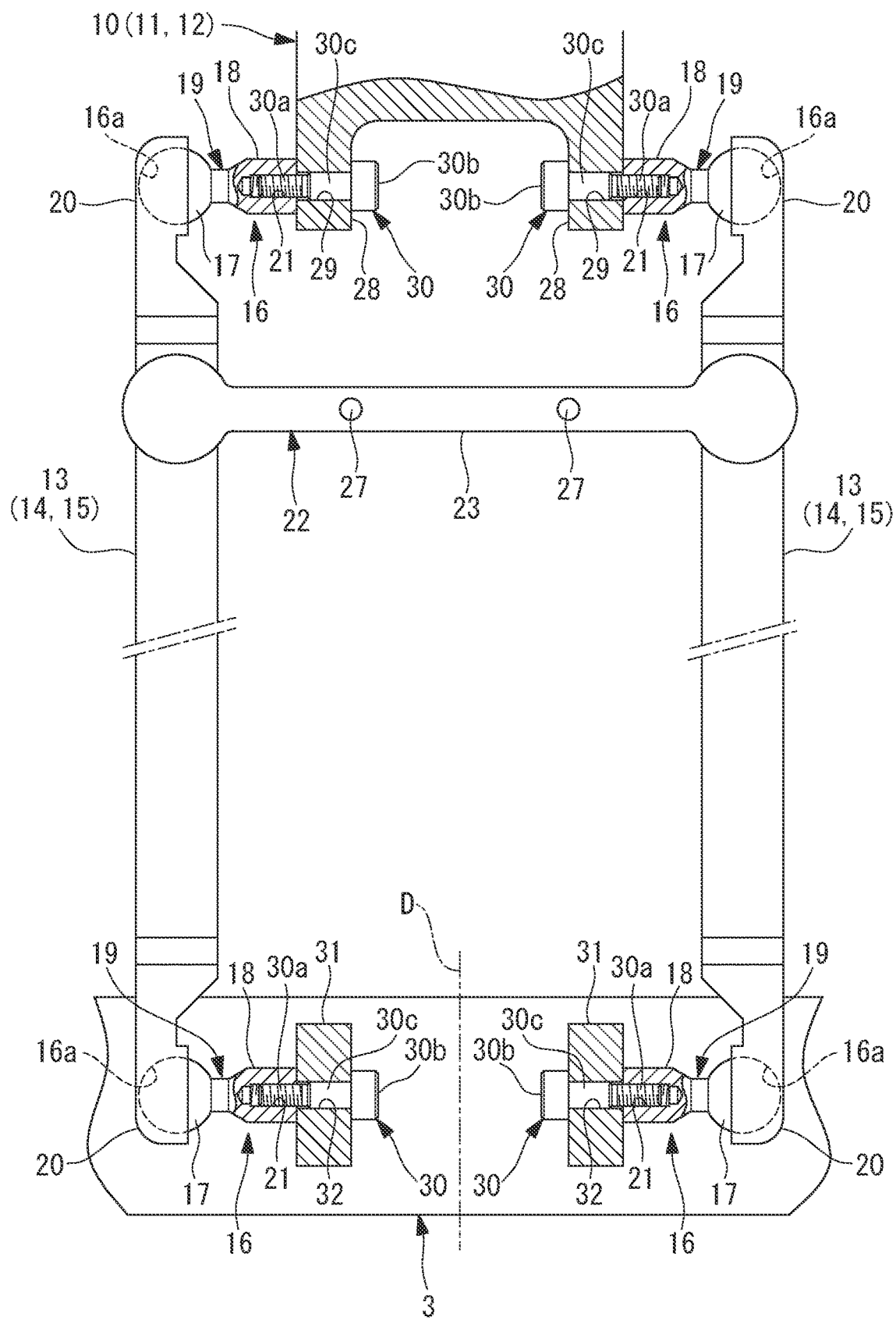
FIG. 2 is a partially sectioned front view illustrating passive links, a drive link, and a movable member of the parallel link robot illustrated in FIG. 1.

As illustrated in FIG. 2, ball joints 16 are attached to both ends of each of the passive links 13, 14, 15 so that the passive links 13, 14, 15 are rotatably connected to the drive links 10, 11, 12 and the movable member 3. Each of the ball joints 16 includes a ball stud 19 and a socket 20. The ball stud 19 includes a ball 17 and a round rod-shaped stud (fixed part) 18 that extends radially outward from the outer surface of the ball 17. The socket 20 has an inner spherical surface 16*a* that partially covers the outer peripheral surface of the ball 17 and supports the ball 17 so that the ball 17 can move about the center point. Rotating the ball 17 about the center point inside the socket 20 can tilt the stud 18 in any desired tilt direction.

In the example illustrated in FIG. 2, sockets 20 are fixed at both ends of each of the passive links 13, 14, 15, and the ball studs 19 are rotatably supported with respect to the passive links 13, 14, 15 within a predetermined angle range centered on a direction orthogonal to the longitudinal axes of the passive links 13, 14, 15.

A screw hole (first screw hole) 21 that extends along the axial direction of the stud 18 is formed in an end surface of each of the studs 18.

Figure 3:
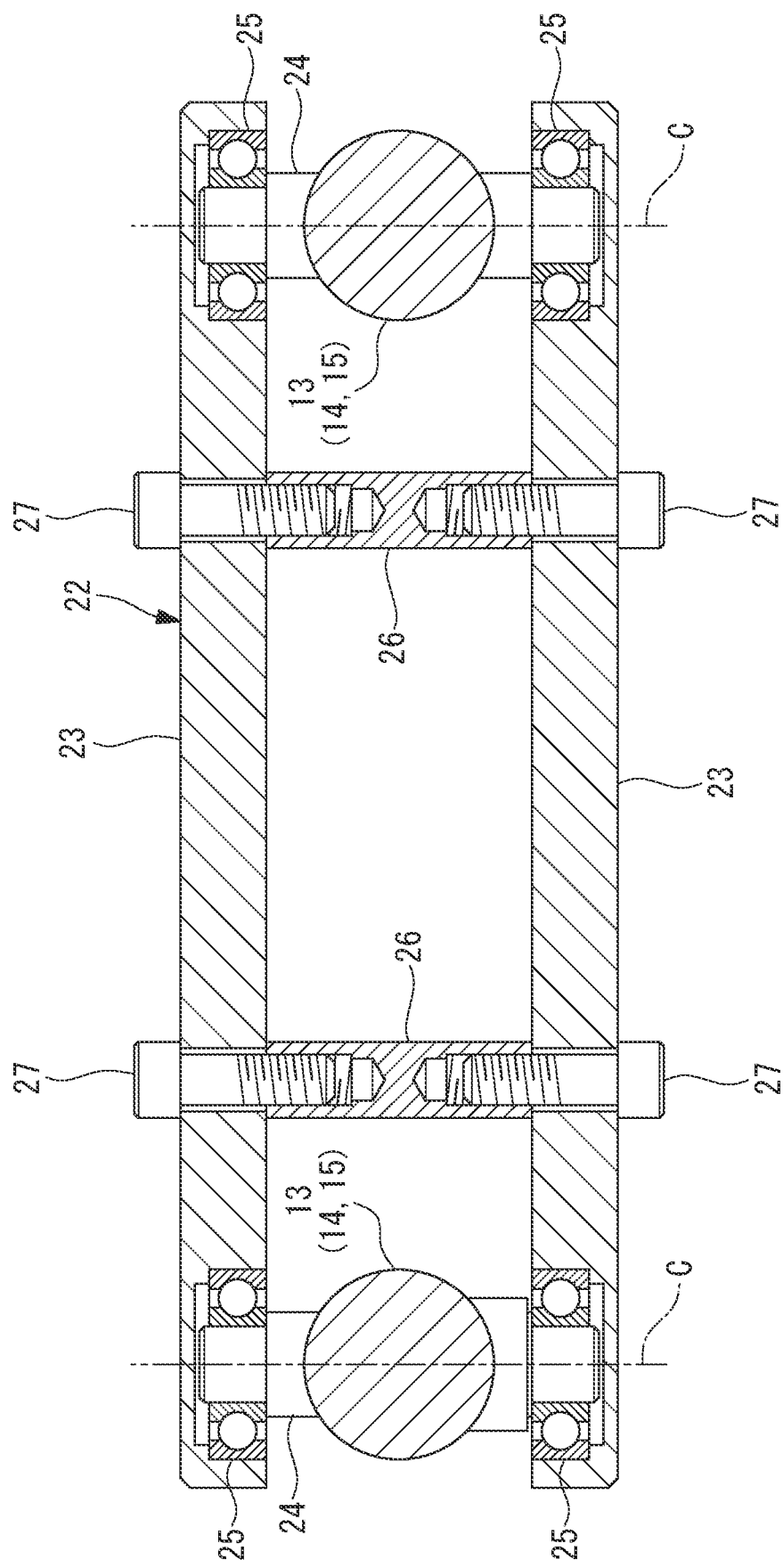
FIG. 3 is a vertical cross-sectional view of a support link in the parallel link robot illustrated in FIG. 1.

As illustrated in FIGS. 2 and 3, support links 22 bridge between the two passive links 13 of the arm 4, the two passive links 14 of the arm 5, and the two passive links 15 of the arm 6. Each of the support links 22 includes two support plates 23 arranged at two sides that radially flank the two passive links 13, 14, 15, and bearings 25 that attach the support plates 23 to shafts 24 fixed to the passive links 13, 14, 15 so that the support plates 23 are rotatable about an axis C orthogonal to the longitudinal axis of the passive link 13, 14, 15.

In the drawings, reference sign 26 denotes a spacer having an appropriately adjusted length to apply a preload to the bearings 25, and reference sign 27 denotes a bolt that attaches the spacer 26 between the two support plates 23.

The support links 22 rotate relative to the passive links 13, 14, 15 in response to the rotation of the two passive links 13, 14, 15 relative to the drive links 10, 11, 12. Thus, even if the passive links 13, 14, 15 are rotated with intense acceleration and deceleration relative to the drive links 10, 11, 12, the respective two passive links 13, 14, 15 of the arms 4, 5, 6 can be maintained parallel.

As illustrated in FIGS. 1 and 2, each of the drive links 10, 11, 12 has two plate-shaped attachment parts 28 that extend along a plane orthogonal to the rotation axis A and that are spaced from each other in the rotation axis A direction, and the attachment parts 28 are disposed at positions where the passive links 13, 14, 15 are attached. As illustrated in FIG. 2, the attachment parts 28 respectively have through-holes (second through-holes) 29 that are parallel to the rotation axis A and extend coaxially. The distance between the outer surfaces of the two attachment parts 28 is set to be equal to the distance between the end surfaces of the ball studs 19 when the longitudinal axes of the ball studs 19 attached to the two passive links 13, 14, 15 are arranged on a straight line.

The drive links 10, 11, 12 are fixed to the ball studs 19 attached to the passive links 13, 14, 15 by fastening bolt members (screw members) 30, which penetrate the through-holes 29 in the attachment parts 28 of the drive links 10, 11, 12 from the inner surface side, into the screw holes 21 in the ball studs 19. Each of the bolt members 30 has a fitting part 30c that lies between a male screw 30a at one end and a head 30b at the other end and that fits into the through-hole 29 in the attachment part 28. In this manner, the ball studs 19 can be fixed in a positioned state onto the attachment parts 28 of the drive links 10, 11, 12.

As illustrated in FIG. 2, at positions in the movable member 3 where three pairs (a total of six, two of which are illustrated in FIG. 2) of passive links 13, 14, 15 are attached, three pairs (six positions, two positions of which are illustrated in FIG. 2) of plate-shaped attachment parts 31 that extend radially outward along a plane parallel to a center axis D from the outer peripheral surface are disposed. The attachment parts 31 of each pair at two positions are arranged to be parallel to each other with a space in a tangential direction about the center axis D, and have through-holes (second through-holes) 32 that extend coaxially in the tangential direction.

In addition, the distance between the outer surfaces of the two attachment parts 31 is also set to be equal to the distance between the end surfaces of the ball studs 19 when the longitudinal axes of the ball studs 19 attached to the two passive links 13, 14, 15 are arranged on a straight line. In this embodiment, the first screw holes 21 in the studs 18, the second through-holes 29 and 32 formed in the attachment parts 28, 31 of the drive links 10, 11, 12 and the movable member 3, and the bolt members 30 penetrating through the second through-holes 29, 32 and fastened to the first screw holes 21 constitute an attachment mechanisms.

The movable member 3 is fixed to the ball studs 19 attached to the passive links 13, 14, 15 by fastening the bolt members 30, which penetrate through the through-holes 32 in the attachment parts 31 of the movable member 3, into the screw holes 21 in the ball studs 19. Each of the bolt members 30 has a fitting part 30c that lies between a male screw 30a at one end and a head 30b at the other end and that fits into the through-hole 32 in the attachment part 31. In this manner, the ball studs 19 can be fixed in a positioned state onto the attachment parts 31 of the movable member 3.

The effects of the parallel link robot 1 of the present embodiment having such features will now be described.

According to the parallel link robot 1 of the present embodiment, by synchronously driving the three servo motors 7, 8, 9, the movable member 3 can be translated to a desired three-dimensional position while maintaining a horizontal posture.

Since the parallel link robot 1 moves the movable member 3 at high speed, the ball joints 16, which connect the drive links 10, 11, 12 to the passive links 13, 14, 15 and the passive links 13, 14, 15 to the movable member 3, are repeatedly and frequently rotated. Thus, the state of the ball joints 16 must be checked regularly, and maintenance such as replacement must be carried out in the event of wear or the like.

Figure 4:
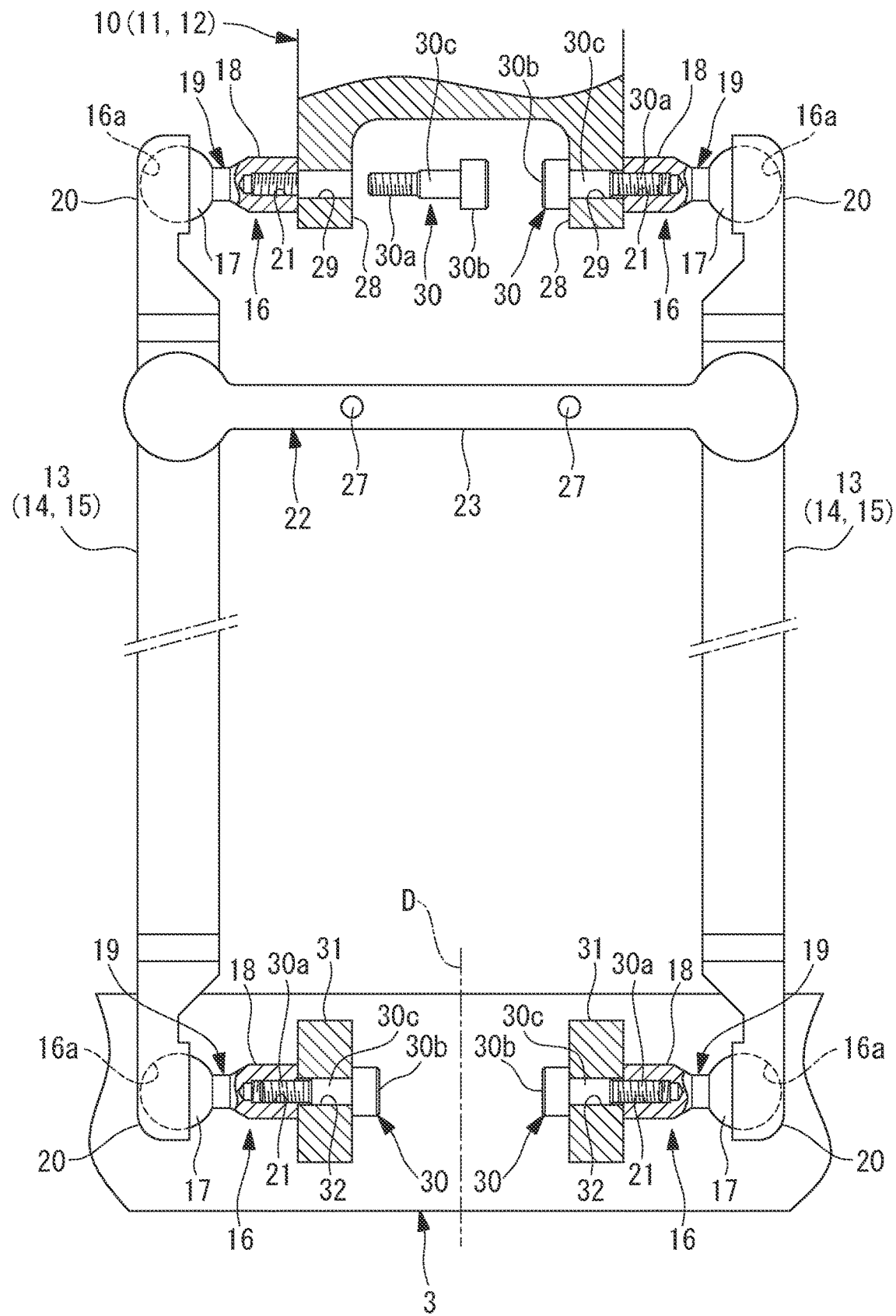
FIG. 4 is a partially sectioned front view illustrating the procedure of replacing ball joints between the passive links and the drive link illustrated in FIG. 2.

According to this embodiment, in order to replace the ball joints 16 connecting the passive links 13, 14, 15 to the drive links 10, 11, 12, first, as illustrated in FIG. 4, the bolt members 30 fastened to the screw holes 21 in the ball studs 19 of the ball joints 16 of the two passive links 13, 14, 15 are loosened and removed.

When removing the bolt members 30, the bolt members 30 are moved toward the inner surface side of the attachment parts 28 of the drive links 10, 11, 12, and thus the bolt members 30 can be removed without changing the distance between the balls 17 of the two ball studs 19.

Figure 5:
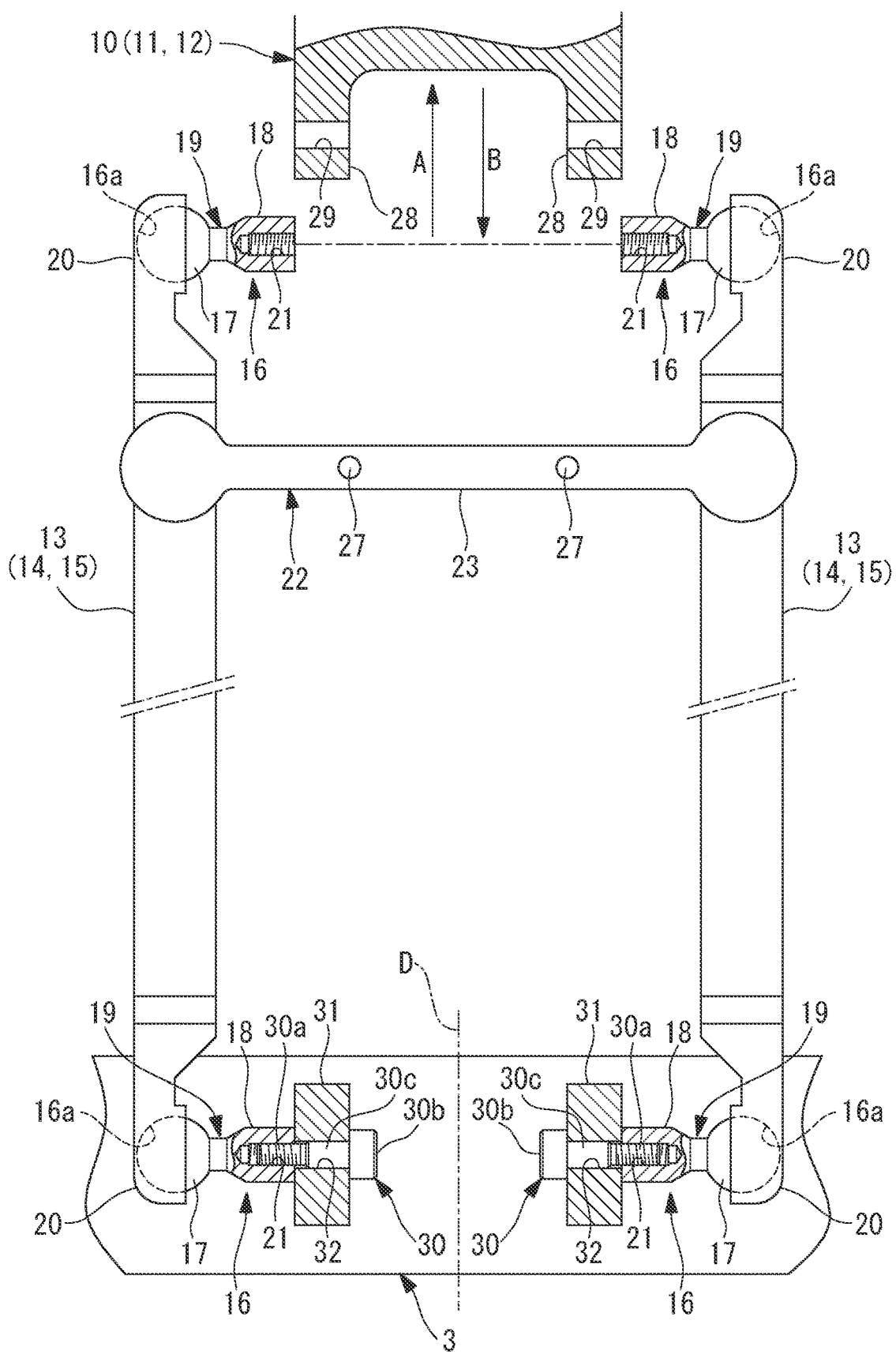
FIG. 5 is a partially sectioned front view illustrating a state in which the passive links are removed from the drive link in the operation of replacing the ball joints illustrated in FIG. 4.

After the bolt members 30 are pulled out of the through-holes 29, as illustrated in FIG. 5, the drive links 10, 11, 12 and the passive links 13, 14, 15 are relatively moved in the direction of the arrow A along the outer side surfaces of the attachment parts 28, and thus the drive links 10, 11, 12 can be separated from the passive links 13, 14, 15. In a state where the passive links 13, 14, 15 are separated from the drive links 10, 11, 12, the ball joints 16 can be easily removed from the end portions of the passive links 13, 14, 15, and can be replaced with new ball joints 16.

Next, the aforementioned procedure is reversed, that is, while the ball studs 19 are arranged so that the longitudinal axes of the studs 18 of the new ball joints 16 attached to the two passive links 13, 14, 15 lie on the same axis, the attachment parts 28 of the drive links 10, 11, 12 are inserted in the direction of the arrow B between the end surfaces of the ball studs 19. Next, the male screws 30a of the bolt members 30 penetrating through the through-holes 29 in the two attachment parts 28 are fastened into the screw holes 21 in the two ball studs 19. This completes the ball stud 19 replacement operation.

As described above, according to the parallel link robot 1 of the present embodiment, when replacing ball joints 16 connecting the drive links 10, 11, 12 to the two passive links 13, 14, 15, there is no need to change the distance between the balls 17 of the two ball joints 16 to be replaced. The distance between the balls 17 of the two ball joints 16 connecting the drive link 10, 11, 12 to the two passive links 13, 14, 15 is fixed by the support link 22 and the two ball joints 16 that connect the movable member 3 to the two passive links 13, 14, 15. Since the distance between the balls 17 does not change during replacement, the ball joints 16 can be replaced without requiring the extensive work of dismantling the support link 22 or disconnecting the movable member 3 from the passive links 13, 14, 15.

In particular, if the two support plates 23 that constitute the support link 22 are firmly fixed by an adhesive, the adhesive will have to be removed to disassemble the support link 22, and this makes disassembly of the support link 22 more difficult. The advantage of this embodiment is that the time required for the operation can be drastically cut since the ball joints 16 are replaced without disassembling the support link 22.

The distance between the balls 17 of the ball joints 16 connecting the movable member 3 to the drive link 13, 14, 15 is fixed by the support link 22 and the two ball joints 16 that connect the drive link 10, 11, 12 to the two passive links 13, 14, 15. Thus, when replacing the ball joints 16 between the movable member 3 and the passive links 13, 14, 15, the replacement can be easily carried out without extensive work, as with the ball joints 16 between the drive links 10, 11, 12 and the passive links 13, 14, 15.

In addition, according to the parallel link robot 1 of this embodiment, a pair of passive links 13, 14, 15, ball joints 16 attached to both ends of the passive links 13, 14, 15, and the support link 22 attached to the passive links 13, 14, 15 can be treated as a passive link unit (unit).

In other words, these parts can be manufactured and managed as a passive link unit, and this offers an advantage in that not only the maintenance operation but also the assembly work can be simplified.

Figure 6:
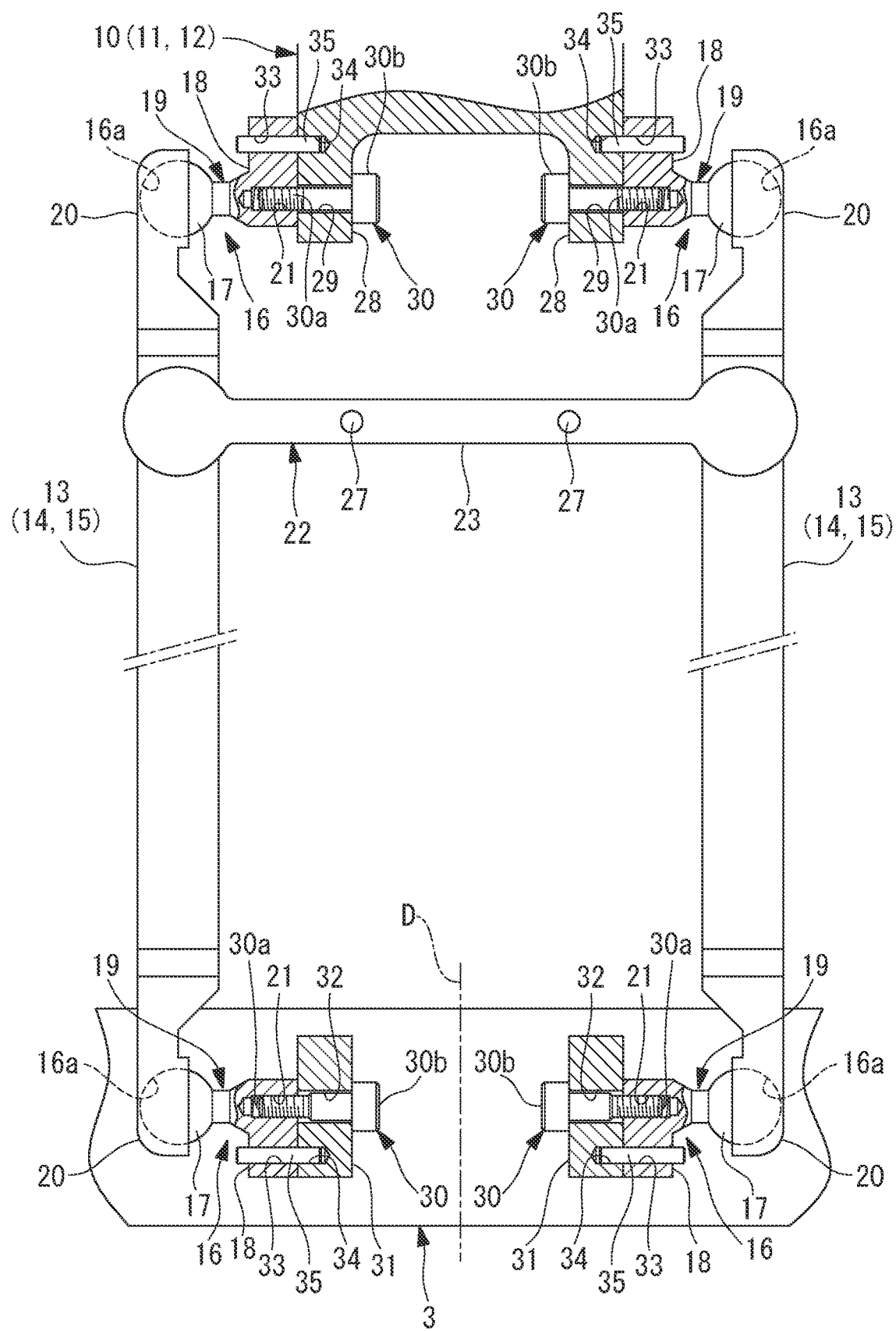
FIG. 6 is a partially sectioned front view illustrating a first modified example of the parallel link robot illustrated in FIG. 1.

In this embodiment, in order to fix the ball studs 19 in the positioned state onto the drive link 10, 11, or 12 or the movable member 3, the fitting parts 30c of the bolt members 30 to be fastened to the screw holes 21 of the ball studs 19 are fitted into the through-holes 29, 32 of the attachment part 28, 31 in the drive link 10, 11, 12 or the movable member 3. Alternatively, as illustrated in FIG. 6, pin holes 33 parallel to the screw holes 21 may be formed in the studs 18 of the ball studs 19, and pin holes 34 parallel to the through-holes 29, 32 may be formed in the attachment parts 28, 31. In this manner, while a positioned state is created by the pins 35 fitted into the pin holes 33 in the studs 18 and the pin holes 34 in the attachment parts 28, 31, the ball studs 19 can be fixed to the drive links 10, 11, 12 and the movable member 3 by fastening common bolts 30, which penetrate through the through-holes 29, 32 and have no fitting parts 30c, into the screw holes 21 in the studs 18.

Figure 7:
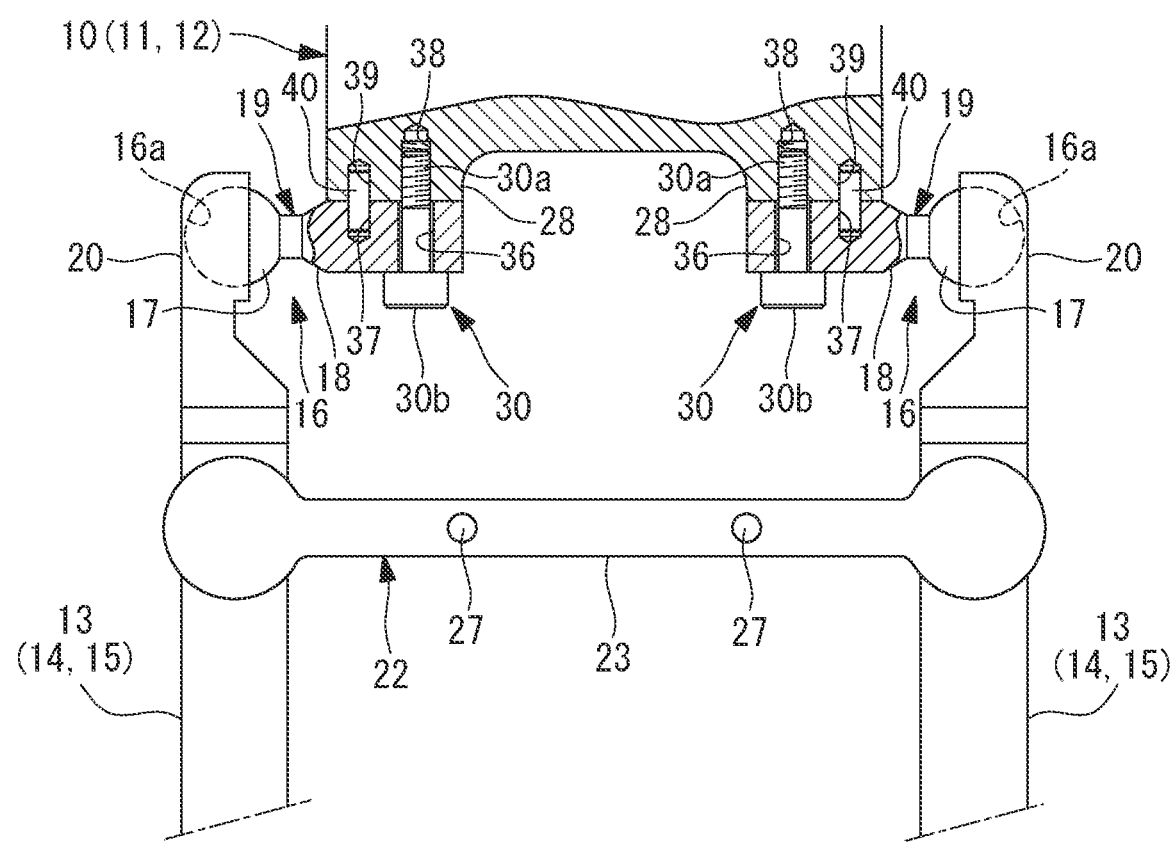
FIG. 7 is a partially sectioned front view illustrating a second modified example of the parallel link robot illustrated in FIG. 1.

Alternatively, instead of inserting the drive link 10, 11, 12 or the attachment part 31 of the movable member 3 between the end surfaces of the stud 18, as illustrated in FIG. 7, the stud 18 may be formed as a flat plate, and the drive link 10, 11, 12 or the movable member 3 may be fixed while being stacked in the thickness direction of the stud 18. In the example illustrated in the drawing, a through-hole (first through-hole) 36 penetrating in the thickness direction and a pin hole 37 parallel to the through-hole 36 are formed in each stud 18, and a screw hole (second screw hole) 38 and a pin hole 39 that extend in the thickness direction are formed in a flat plate-shaped attachment part 28 parallel to the rotation axis A in the drive link 10, 11, 12.

Then, in a positioned state created by pins 40 fitted into the pin holes 37 in the studs 18 and the pin holes 39 in the attachment parts 28, the bolts 30 penetrating through the through-holes 36 are fastened into the screw holes 38 in the attachment parts 28 to thereby fix the ball studs 19 to the drive link 10, 11, 12 or the movable member 3. In this case, the first through-holes 36 formed in the studs 18, which serve as a fixed part, the second screw holes 38 formed in the drive link 10, 11, 12 or the attachment part 28, 31 of the movable member 3, and the bolt members 30 penetrating through the first through-holes 36 and fastened to the second screw holes 38 constitute an attachment mechanism.

In addition, the parallel link robot 1, instead of having three arms 4, 5, and 6, may have any number of arms more than 1.

Furthermore, although the case in which the ball joints 16 that respectively connect the drive links 10, 11, 12 to the passive links 13, 14, 15 and the ball joints 16 that connect the movable member 3 to the passive links 13, 14, 15 have an identical structure is described above, this feature is not limiting, and the aforementioned feature may be employed in only one of the ball joints 16.

Figure 8:
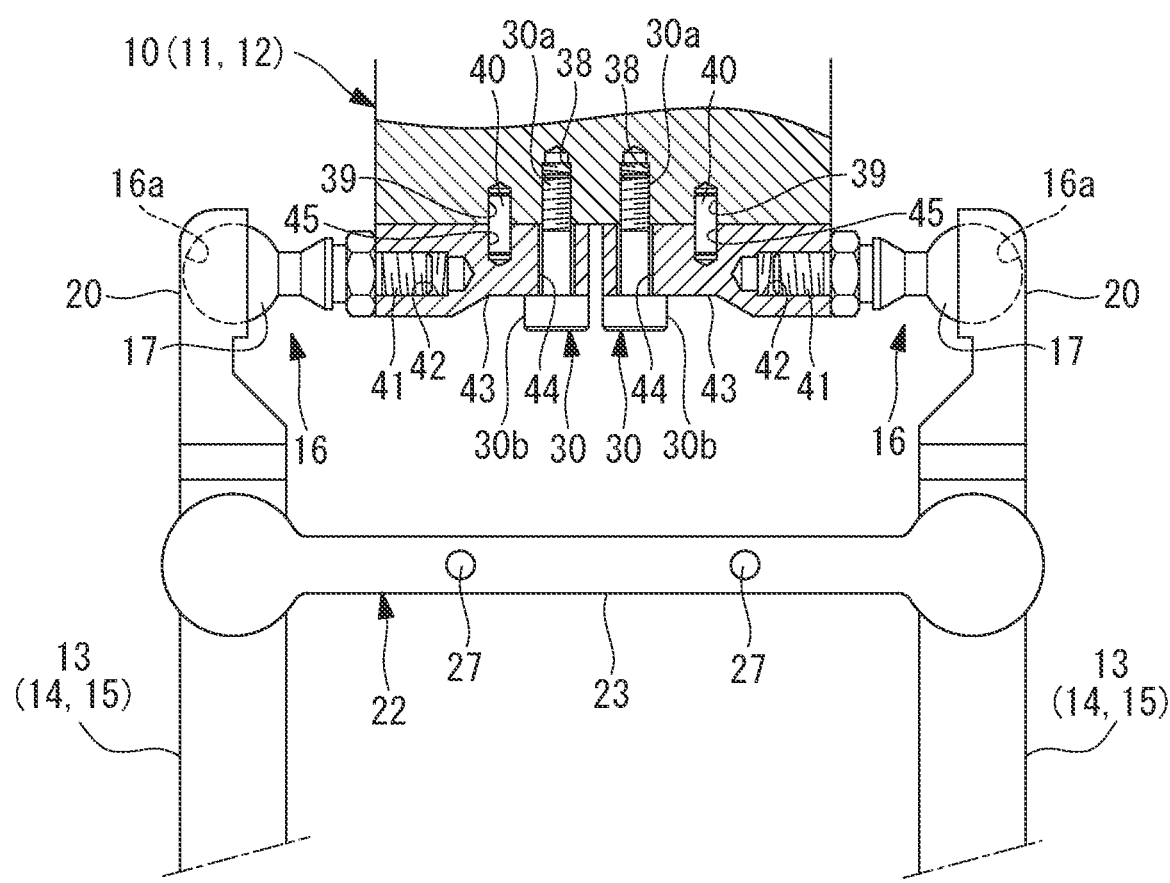
FIG. 8 is a partially sectioned front view illustrating a third modified example of the parallel link robot illustrated in FIG. 1.

In addition, in the embodiments described above, the case in which the studs 18 have screw holes 21 or the through-holes 36 is described; alternatively, as illustrated in FIG. 8, a structure that includes studs 18 that have male screws 41 and adapters 43 that have screw holes 42 into which the male screws 41 of the studs 18 are fastened may be employed. In this case, the studs 18 and the adapters 43 function as a fixed part, and the through-holes (first through-holes) 44 and the pin holes 45 may be formed in the adapters 43.

Figure 9:
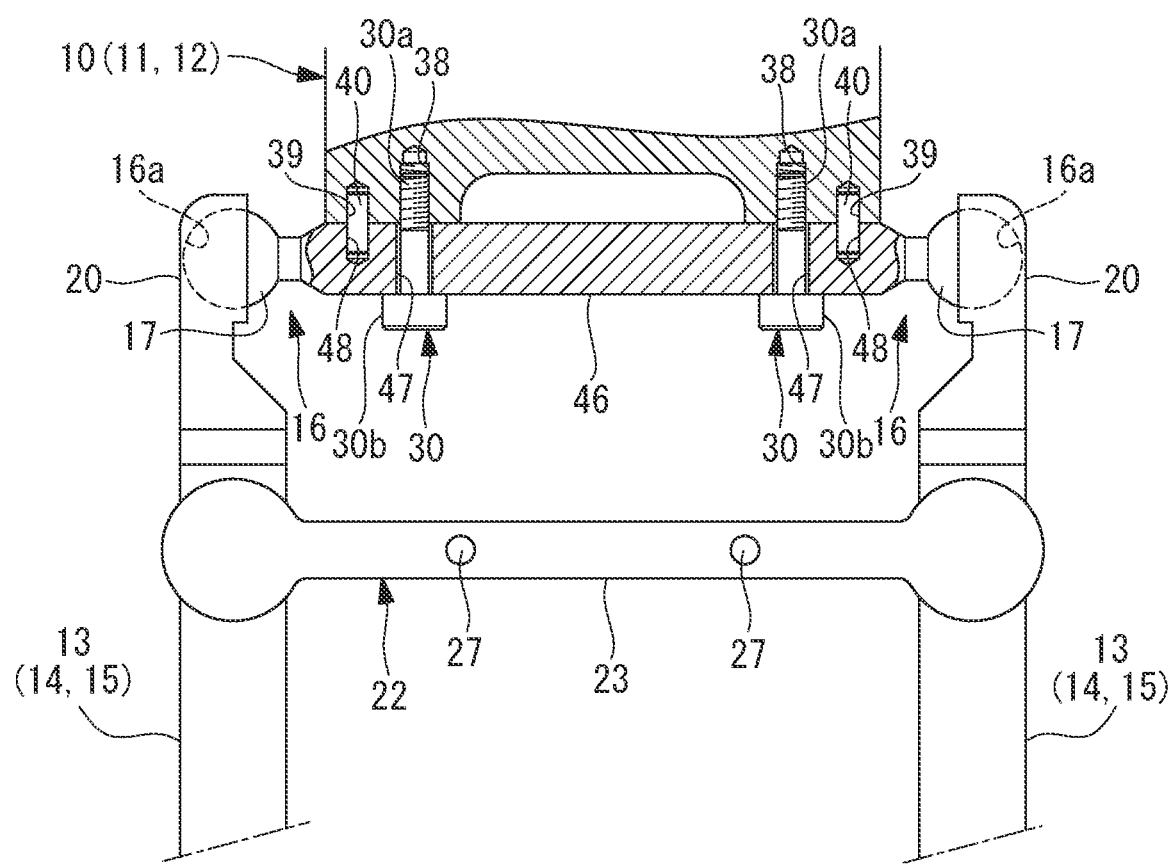
FIG. 9 is a partially sectioned front view illustrating a fourth modified example of the parallel link robot illustrated in FIG. 1.

In the embodiments described above, the studs 18 of the ball joints 16 to be attached to the passive links 13, 14, 15 are separately provided for each of the passive links 13, 14, 15. Alternatively, as illustrated in FIG. 9, a structure that includes two balls 17 and one integral stud (fixed part) 46 that connects the two balls 17 may be employed as the ball joints 16 that form a pair. In this case, one or more through-holes (first through-holes) 47 or screw holes (first screw holes, not illustrated) and one or more pin holes 48 are formed in the stud 46. In this case too, the passive link unit that includes the ball joints 16 can be removed from the drive links 10, 11, 12 and the movable member 3 without disassembling the support link 22.

Therefore, when a structure that allows the sockets 20 to detach from the passive links 13, 14, 15 without rotating the sockets 20 about the longitudinal axis of the passive links 13, 14, 15 is employed, replacement can be done on the basis of assembly units each including two ball joints 16 and a single stud 18. Alternatively, the ball joints 16 can be replaced by replacing the whole passive link unit.

REFERENCE SIGNS LIST 1 parallel link robot
2 base part
3 movable member
4, 5, 6 arm
7, 8, 9 servo motor (motors)
10, 11, 12 drive link
13, 14, 15 passive link
16 ball joint
17 ball
18, 46 studs (fixed part)
21 screw hole (first screw hole)
22 support link
29, 32 through-hole (second through-hole)
30 bolt member (screw member)
36, 44, 47 through-hole (first through-hole)
38 screw hole (second screw hole)
43 adapter (fixed part)
C axis

The invention claimed is:

1. A parallel link robot comprising:
   a base part;
   a movable member spaced from the base part; and
   a plurality of arms that connect the base part and the movable member in parallel,
   wherein each of the arms comprises:
      a drive link rotationally driven by a motor installed in the base part;
      two parallel passive links that connect the drive link to the movable member;
      a ball joint disposed between the passive links and the drive link and a ball joint disposed between the passive links and the movable member;
      attachment mechanisms that detachably attach each of the ball joints to the drive link or the movable member, each of the ball joints comprises a ball and a fixed part integrated with the ball; and
      a support link that bridges between the two passive links of each of the arms to connect the two passive links to each other, the two passive links and the support link forming an assembly, and
   in each of the arms, at least one of the attachment mechanism between the passive links and the drive link and the attachment mechanism between the passive links and the movable member comprises a first screw hole or first through-hole formed in the fixed part, a second through-hole or second screw hole formed in the drive link or the movable member, and a screw member that penetrates through the first through-hole and is fastened to the second screw hole or that penetrates through the second through-hole and is fastened to the first screw hole to attach the assembly to at least one of the drive link and the movable member, and
   the screw member is configured to be separated from at least one of the second screw hole or the first screw hole to enable the assembly to be separated as a single element from at least one of the drive link and the movable member.

2. The parallel link robot according to claim 1, wherein, in each of the arms, at least one of the ball joint between the passive links and the drive link and the ball joint between the passive links and the movable member comprises two ball joints, and the fixed parts of the two ball joints are integrally formed.

3. The parallel link robot according to claim 1, wherein the support link is attached to the passive links so as to be rotatable about an axis orthogonal to a longitudinal axis of the passive links.

4. The parallel link robot according to claim 3, wherein the two passive links with the ball joints attached to both ends thereof serve as a unit connected by the support link and are detachably attached to the drive link and the movable member.

* * * * *